3,291,598
RECOVERY OF COPPER AND ZINC VALUES USING LIQUID NITROGEN TETROXIDE

Carl K. Amano, Denver, and Clifford J. Lewis, Lakewood, Colo., assignors to Allied Chemical Corporation, New York, N.Y., a corporation of New York
No Drawing. Filed July 9, 1964, Ser. No. 381,538
11 Claims. (Cl. 75—101)

This invention relates to a process for recovering copper and/or zinc values from sulfide and oxide ores containing the same. As used herein, we intend the term "ores" to include concentrates prepared from the ores in known manner.

In the recovery of copper and/or zinc values from their ores, physical upgrading procedures, such as simple scrubbing operations, flotation, air classification, heavy media separation and the like, are frequently adequate for producing the desired metal or metals in form sufficiently pure for final separation thereof.

There are many ores, however, which cannot economically yield the desired metal or metals by physical upgrading procedures. For example, the metal may be contained in a mineral in the ore, which mineral does not respond to physical treatment. Further, the mineral containing the metal may be present in such finely-divided form that the entire matrix containing the mineral must be finely ground to liberate the mineral. In such case, subsequent physical upgrading procedures fail because of the fine particles involved.

In conventional operation, copper and/or zinc values are recovered from sulfide ores by leaching them with sulfuric acid to solubilize the metal values and subsequently treating the resulting solution to separate, concentrate and recover the desired metal or metals. In all of such processes reagent loss is considerable, thereby resulting in relatively expensive operation.

It is the primary object of this invention to provide a simple and economical process for recovering copper and/or zinc values from sulfide and oxide ores containing the same.

Another object of this invention is to provide a simple and economical process for selectively converting copper and/or zinc values contained in sulfide and oxide ores to water-soluble salts.

Other objects and advantages will be apparent from the following description.

According to the present invention, copper and/or zinc values are selectively recovered from sulfide or oxide ores or mixtures thereof by a process which comprises first contacting the ore with liquid nitrogen tetroxide and water, the water being present in at least about the theoretical amount up to about 100% in excess thereof to form the corresponding water-soluble nitrate and the nitrogen tetroxide being present in amount at least about 15 times the amount of water, removing the excess nitrogen tetroxide, and then leaching the water-soluble nitrate from the treated ore with water.

A preferred embodiment of the process of this invention involves moisturization of finely-divided ore to a predetermined degree and utilization of this moisture to control the uniform generation and distribution of comparatively small amounts of concentrated nitric acid on contacting the moisturized ore with liquid nitrogen tetroxide. The liquid nitrogen tetroxide serves as the medium for slurrying the moisturized ore under conditions of strong agitation. In an alternative procedure the water and liquid nitrogen tetroxide may be admixed with finely-divided ore and the mixture refluxed. According to another alternative procedure, finely-divided ore may be slurried in the liquid nitrogen tetroxide and the required amount of water added at a slow rate while agitating the slurry.

The range of temperature maintained during the treatment with water and liquid nitrogen tetroxide extends from about 10° to 21° C., with temperatures within the range of about 18° to 21° C. being preferred. The ore slurry is generally agitated for a period of about 1½ to 2 hours in order to obtain high recovery of copper and/or or zinc values.

As the ore slurry is agitated the nitric acid formed is evenly distributed throughout the bulk of the ore, aided by the large quantity of liquid nitrogen tetroxide employed thereby converting the copper and/or zinc to the corresponding water-soluble nitrate.

It is essential that water be added to the ore in at least about the theoretical amount up to about 100% in excess thereof to form the water-soluble copper and/or zinc nitrate. Preferably the amount of water used ranges from the theoretical amount up to about 25% in excess thereof. The liquid nitrogen tetroxide is added in amount about 15 to 100, preferably about 25 to 40, times the amount of water and serves both to generate the desired quantity of nitric acid and to insure uniform distribution of the acid throughout the ore.

The theoretical amount of water is predicated on the following equations:

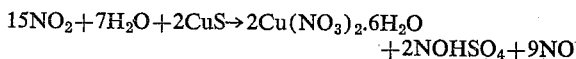
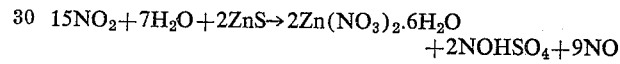

Excess nitrogen tetroxide may be recovered from the treated ore by filtration and/or volatilization. The nitrogen tetroxide is then condensed and recirculated for reuse in the process.

The ore containing water-soluble copper and/or zinc nitrate is leached with water to extract the nitrate. This solution can then be subjected to an evaporation step to concentrate the nitrate. Subsequently the solution is cooled to crystallize the nitrate which is then filtered off. The nitrate crystals may finally be processed by thermal decomposition to yield purified copper and/or zinc oxides and nitrogen oxide values for recycle. The foregoing nitrate leach solution or the purified metal oxides may be processed by known routes to recover copper and/or zinc metal in relatively pure form. Nitrogen tetroxide is recovered for recycle from the nitrosyl sulfuric acid (NOHSO$_4$) contained in copper and/or zinc barren leach solutions by diluting with water to yield volatile nitrogen oxides and sulfuric acid.

The residue after leaching may be discarded or, if desired, used for recovery of other constituents present in the ore.

Any ore or cencentrate containing copper and/or zinc in sulfide or oxide form may be treated in accordance with this invention to recover copper and/or zinc values therefrom. Typical copper ore minerals include chalcopyrite (CuFeS$_2$), chalcocite (Cu$_2$S), bornite (Cu$_5$FeS$_4$), tetrahedrite (Cu$_3$SbS$_3$+(Fe, Zn)$_6$Sb$_2$S$_9$), malachite

azurite (2CuCO$_3$.Cu(OH)$_2$), and cuprite (CU$_2$O$_6$). Typical zinc ore minerals include sphalerite (ZnS), smithsonite (ZnCO$_3$), and hemimorphite (ZnOH)$_2$SiO$_3$. Typical concentrates include copper and/or zinc sulfide flotation concentrates, lead sulfide flotation concentrates containing copper and/or zinc sulfides and residues resulting from the calcination of pyrite concentrates.

As indicated above, the salient feature of the process of this invention involves controlled moisturization of finely-divided ore and subsequent utilization of the moisture to effect a uniform reaction throughout the ore upon contacting it with a large excess of liquid nitrogen tetroxide, the latter also serving as a medium to slurry the ore. Concentrated nitric acid is generated uniformly throughout the ore but only in a quantity to selectively attack a predetermined metal (or metals), as determined by the degree of moisturization of the ore. This process prevents strong localized attack of the ore as would occur if an equivalent amount of concentrated acid were used directly. Use of the process also has the advantage of effecting a strong oxidation reaction which could not be achieved through use of dilute nitric acid. The ability to convert sulfides and oxides to their water-soluble salts with only a theoretical quantity of water present also affords an advantage of the process over acid leaching techniques in terms of the acid or acid equivalents consumed. Thus, removal of excess liquid nitrogen tetroxide by volatilization after contacting the ore offers an operational advantage in minimizing reagent losses as compared to conventional acid leaching operations in which losses occur in waste leach liquors and in dilute wash solutions. The process also offers means of further upgrading certain sulfide concentrates from flotation operations in instances where the liberation grind is too fine for efficient separations by flotation. An important advantage of the process is in the recovery of copper and/or zinc values from their oxide or mixed sulfide-oxide ores. Whereas copper and/or zinc in sulfide ores are readily concentrated by known flotation procedures, their oxides do not respond well to flotation but rather tend to hinder the flotation of the sulfides.

As illustrated by following Examples 1 and 2, the principle of the present invention was applied to problems of certain metallurgical processes. These problems involved:

(1) separation of comparatively small quantities of copper and zinc from iron in a residue resulting from the calcination of a pyrite concentrate obtained during manufacture of sulfuric acid, and (2) removal of zinc from a lead sulfide concentrate containing considerable zinc sulfide where further upgrading by flotation was impractical.

Example 3 is included to illustrate the removal of copper and zinc from a mixed oxide.

In the examples, parts are by weight.

EXAMPLE 1

A pyrite-calcine residue contained 59.2% iron, 0.88% copper and 0.75% zinc. 50 parts of the residue ground to about 325 mesh size were treated with 0.8 part of water (the amount theoretically required to convert the copper and zinc to their water-soluble nitrates). The moisturized residue was then contacted with 100 parts of liquid nitrogen tetroxide for a period of 1 hour in a polyethylene rolling vessel containing cylindrical Borundum grinding media to effect thorough mixing. The residue was then leached with 100 parts of water. Analysis of the water leach filtrate showed that 66% of the copper and only 2.6% of the iron was removed from the ore.

Additional experiments of this type, in which the products were analyzed for zinc, showed the selectivity toward zinc removal from pyrite-calcine residues to be greater than that for copper.

EXAMPLE 2

Twenty parts of an approximately 65 mesh lead sulfide concentrate (46.9% lead and 13.5% zinc) was uniformly moisturized with 3.3 parts of water (25% in excess of the amount theoretically required to convert the zinc to its water-soluble nitrate) and then contacted under conditions of strong agitation with 100 parts of liquid nitrogen tetroxide in a vessel fitted with a reflux condenser. The liquid nitrogen tetroxide was filtered from the residue, and the remaining nitrogen tetroxide in the residue along with any water was volatilized by heating the mixture to 100° C. The dried residue was then leached with 100 parts of water at about 80° C. to dissolve all of the metal values that had been converted to their water-soluble form. Undissolved solids were filtered and dried. The hot water leach filtrate and the final residue were analyzed for lead and zinc content. Removal of about 98% of the zinc and none of the lead was effected.

EXAMPLE 3

Fifty parts of a mixture consisting of equal molar amounts of copper oxide (CuO), zinc oxide (ZnO) and lead oxide (PbO) were contacted with 100 parts of liquid nitrogen tetroxide under conditions of strong agitation in a vessel fitted with a reflux condenser. Exactly 2.5 parts of water were added dropwise while continuously agitating the mixed oxide-nitrogen tetroxide system. Agitation was continued for ten minutes after addition of the water. The liquid nitrogen tetroxide was filtered from the residue and that remaining was volatilized by heating the treated oxide mixture to 100° C. The treated oxide mixture was then leached with 100 parts of water at 80° C. to dissolve any of the metal values converted to their soluble nitrate forms. The undissolved mixed oxide solids were filtered, dried, weighed and subjected to a second stage of contact with liquid nitrogen tetroxide and controlled addition of 2.5 parts of water. This nitrogen tetroxide contact-water leaching procedure was successively repeated on the resulting mixed oxide residue (reusing the liquid nitrogen tetroxide plus sufficient makeup to give 100 parts) until 5 complete stages were accomplished. The water leach filtrates from the 5 stages of contact and the final oxide residue were analyzed for their copper and zinc content. The resulting data are summarized below in Table 1.

*Table 1*

| Stages of Contact | Percent Metal Removed | | | |
|---|---|---|---|---|
| | Direct | | Cumulative | |
| | Zn | Cu | Zn | Cu |
| First | 84.3 | 0.0 | 84.3 | 0.0 |
| Second | 11.0 | 17.5 | 95.3 | 17.5 |
| Third | 1.7 | 26.6 | 97.0 | 44.1 |
| Fourth | 1.3 | 11.0 | 98.3 | 55.1 |
| Fifth | 0.5 | 10.6 | 98.8 | 65.7 |
| Final Residue [1] | 1.2 | 34.3 | | |

[1] Percent metal not removed from mixed oxide sample in 5 stages of contact.

While in the foregoing specification there have been described preferred embodiments of the present invention, modifications may be made therein without departing from the spirit of the invention, and it is intended to cover all such as fall within the scope of the appended claims.

We claim:

1. A process for recovering at least one of copper and zinc values from an ore containing the same, said ore comprising a member selected from the group consisting of sulfide ores, oxide ores and mixtures thereof, which comprises contacting the ore with liquid nitrogen tetroxide and water, the water being present in at least about the theoretical amount up to about 100% in excess thereof to form the corresponding water-soluble nitrate and the nitrogen tetroxide being present in amount at least about 15 times the amount of water, removing the excess nitrogen tetroxide, and then leaching the water-soluble nitrate from the treated ore with water.

2. The process of claim 1 wherein the water is employed in at least the theoretical amount up to about 25% in excess thereof.

3. The process of claim 1 wherein the liquid nitrogen tetroxide is employed in amount about 15 to 100 times the amount of water.

4. The process of claim 1 wherein finely-divided ore is treated with the water and the moisturized ore is then contacted with the liquid nitrogen tetroxide.

5. The process of claim 1 wherein the water and the liquid nitrogen tetroxide are admixed with finely-divided ore and the mixture is then refluxed.

6. The process of claim 1 wherein finely-divided ore is slurried in the liquid nitrogen tetroxide and the water is then added at a slow rate while agitating the slurry.

7. The process of claim 1 wherein copper is recovered from a sulfide ore containing the same.

8. The process of claim 1 wherein copper is recovered from an oxide ore containing the same.

9. The process of claim 1 wherein zinc is recovered from a sulfide ore containing the same.

10. The process of claim 1 wherein zinc is recovered from an oxide ore containing the same.

11. The process of claim 1 wherein the excess nitrogen tetroxide is recovered and recirculated for use in contacting fresh ore charge.

References Cited by the Examiner

UNITED STATES PATENTS

| | | | |
|---|---|---|---|
| 971,252 | 9/1910 | Clancy | 75—101 |
| 1,210,724 | 1/1917 | Thofehrn | 75—101 |

DAVID L. RECK, *Primary Examiner.*

N. F. MARKVA, *Assistant Examiner.*